US009729055B1

(12) United States Patent
Yao et al.

(10) Patent No.: US 9,729,055 B1
(45) Date of Patent: Aug. 8, 2017

(54) SYSTEMS AND METHODS OF INCREASING POWER CONVERTER EFFICIENCY

(71) Applicant: General Electric Company, Schenectady, NY (US)

(72) Inventors: Guofei Yao, Shanghai (CN); Qixue Yu, Shanghai (CN); Xiaowei Ye, Shanghai (CN); Steven Li, Shanghai (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/643,765

(22) Filed: Mar. 10, 2015

Related U.S. Application Data

(60) Provisional application No. 62/067,773, filed on Oct. 23, 2014.

(51) Int. Cl.
*H02M 3/158* (2006.01)
*H02M 3/156* (2006.01)
*H02M 1/00* (2006.01)

(52) U.S. Cl.
CPC .......... *H02M 3/158* (2013.01); *H02M 3/156* (2013.01); *H02M 3/1588* (2013.01); *H02M 2001/007* (2013.01)

(58) Field of Classification Search
CPC ......... H02M 2001/007; H02M 3/1588; H02M 3/158; H02M 3/156
See application file for complete search history.

(56) References Cited

U.S. PATENT DOCUMENTS

| 5,155,670 | A | | 10/1992 | Brian |
| 5,179,508 | A | * | 1/1993 | Lange .................. H02J 7/0065 323/222 |
| 7,009,852 | B2 | | 3/2006 | Ying et al. |
| 8,467,199 | B2 | | 6/2013 | Lee et al. |

(Continued)

FOREIGN PATENT DOCUMENTS

| CA | 2758898 A1 | 5/2013 |
| JP | 2008011665 A | 1/2008 |

(Continued)

OTHER PUBLICATIONS

Rong Guo, "A multi-modes charge-pump based high efficiency wide input range DC-DC converter", Energy Conversion Congress and Exposition (ECCE), 2010 IEEE, Sep. 12-16, 2010; pp. 2706-2712.

*Primary Examiner* — Timothy J Dole
*Assistant Examiner* — Ishrat Jamali
(74) *Attorney, Agent, or Firm* — General Electric Company

(57) ABSTRACT

Systems and methods of increasing power converter efficiency are provided. A power converter includes a boost circuit configured to receive a DC input voltage ranging from a minimum input voltage value to a maximum voltage value, boost the DC input voltage to a predefined nominal voltage value when the DC input voltage has a value between the minimum input voltage value and the predefined nominal voltage value, and maintain the DC input voltage when the DC input voltage has a value that is greater than or equal to the predefined nominal voltage value and less than the maximum input voltage value. The unit also includes a DC-DC converter coupled to an output of the boost circuit, the DC-DC converter configured to convert the boosted DC voltage or the maintained DC voltage to a DC output voltage.

20 Claims, 3 Drawing Sheets

(56) References Cited

U.S. PATENT DOCUMENTS

| | | | | |
|---|---|---|---|---|
| 8,872,499 B2* | 10/2014 | Kim | ...................... | H02M 3/158 |
| | | | | 323/266 |
| 2006/0006850 A1* | 1/2006 | Inoue | .................... | H02J 7/0065 |
| | | | | 323/265 |
| 2008/0316779 A1* | 12/2008 | Jayaraman | .......... | H02M 1/4225 |
| | | | | 363/74 |
| 2010/0156175 A1* | 6/2010 | Wei | ...................... | H02J 7/0065 |
| | | | | 307/31 |
| 2010/0231185 A1* | 9/2010 | Yu | ......................... | H01R 31/06 |
| | | | | 323/282 |
| 2011/0210710 A1 | 9/2011 | Yamamoto et al. | | |
| 2013/0343092 A1 | 12/2013 | Lin et al. | | |

FOREIGN PATENT DOCUMENTS

| | | | |
|---|---|---|---|
| WO | 2012155325 | A1 | 11/2012 |
| WO | 2013166579 | A1 | 11/2013 |

\* cited by examiner

SYSTEMS AND METHODS OF INCREASING POWER CONVERTER EFFICIENCY

CROSS REFERENCE TO RELATED APPLICATIONS

This application is a non-provisional application and claims priority to U.S. Provisional Patent Application Ser. No. 62/067,773 filed Oct. 23, 2014 for "SYSTEMS AND METHODS OF IMPROVING DC-DC CONVERTER EFFICIENCY", which is hereby incorporated by reference in its entirety.

BACKGROUND

The field of the invention relates generally to power supplies, and more particularly, to systems and methods of increasing power converter efficiency.

At least some known wide-input voltage DC-DC conversion units use a single-stage DC-DC converter circuit, for example, a full-bridge circuit, to convert a direct current (DC) input voltage into a desired DC output voltage. At least some of these full-bridge circuits are designed to have a transformer turns ratio based on a predefined minimum input voltage to be received by the DC-DC conversion unit. Basing the transformer turns ratio on the predefined minimum input voltage, rather than its most effective operating condition, nominal input voltage, causes the DC-DC converter circuit to operate at a reduced duty cycle. Operating at a reduced duty cycle causes a decrease in efficiency of the DC-DC converter circuit, and accordingly, a decrease in total efficiency of the DC-DC power conversion unit.

BRIEF DESCRIPTION

In one aspect, a power conversion unit includes a boost circuit configured to receive a DC input voltage ranging from a minimum input voltage value to a maximum voltage value, boost the DC input voltage to a predefined nominal voltage value when the DC input voltage has a value between the minimum input voltage value and the predefined nominal voltage value, and maintain the DC input voltage when the DC input voltage has a value that is greater than or equal to the predefined nominal voltage value and less than the maximum input voltage value. The unit also includes a DC-DC converter coupled to an output of the boost circuit, the DC-DC converter configured to convert the boosted DC voltage or the maintained DC voltage to a DC output voltage.

In another aspect, a method of improving efficiency in a power conversion unit is provided. The method includes receiving, by a boost circuit, a direct current (DC) input voltage from a power supply. The DC input voltage ranges from a minimum input voltage value to a maximum input voltage value. The method also includes boosting, by the boost circuit, the DC input voltage to a predefined nominal voltage value when the DC input voltage has a value between the minimum input voltage value and the predefined nominal voltage value. The method also includes maintaining, by the boost circuit, the DC input voltage when the DC input voltage has a value that is greater than or equal to the predefined nominal voltage value and less than the maximum input voltage value. The method further includes converting, by a DC-DC converter coupled to an output of the boost circuit, the one of the boosted DC voltage and the maintained DC voltage to a DC output voltage.

In yet another aspect, a boost circuit is provided. The boost circuit is configured to receive a direct current (DC) input voltage from a power supply. The DC input voltage ranges from a minimum input voltage value to a maximum input voltage value. The boost circuit is also configured to boost the DC input voltage to a predefined nominal voltage value when the DC input voltage has a value between the minimum input voltage value and the predefined nominal voltage value. The boost circuit is further configured to maintain the DC input voltage when the DC input voltage has a value that is greater than or equal to the predefined nominal voltage value and less than the maximum input voltage value.

DETAILED DESCRIPTION

Figure 1:
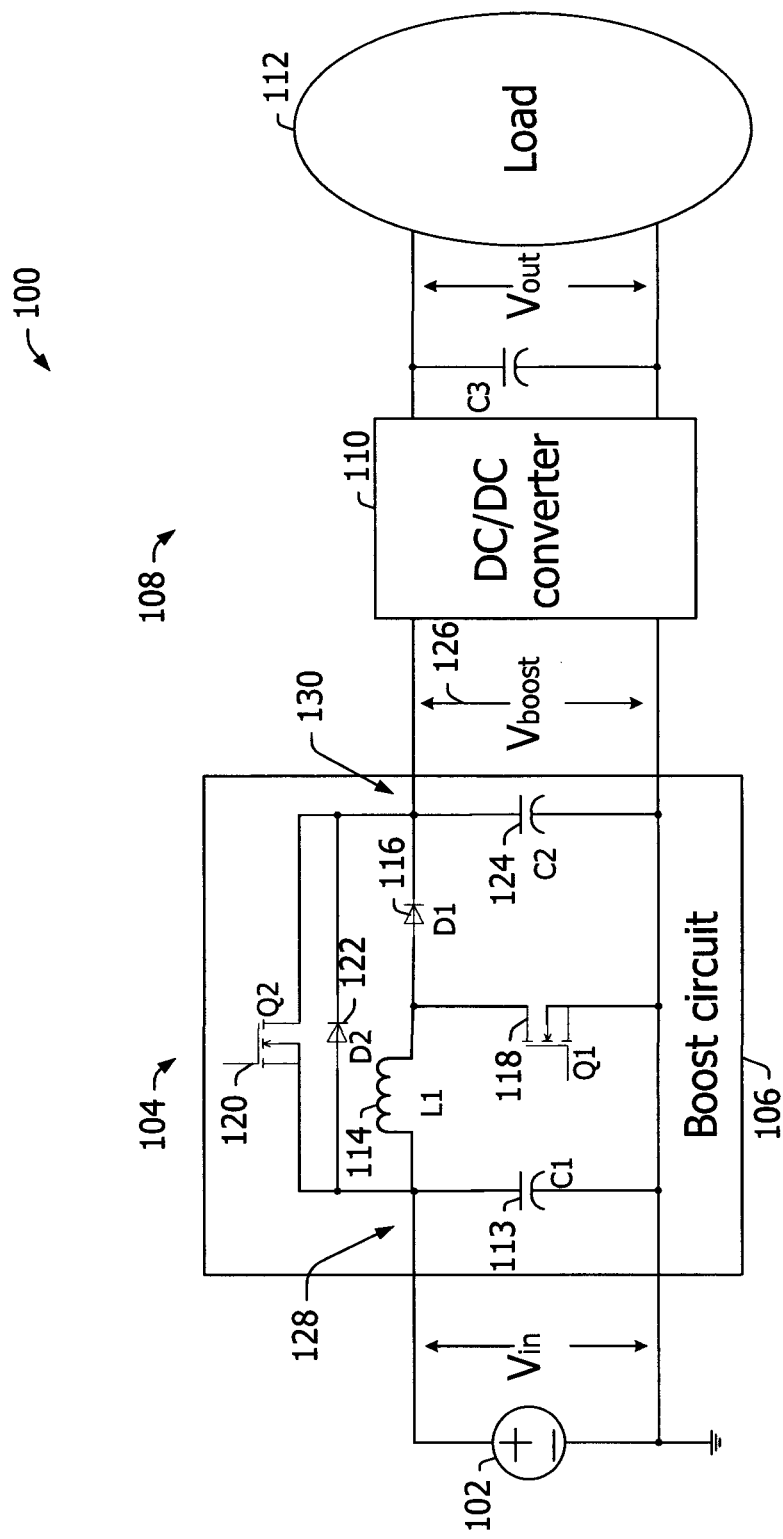
FIG. 1 is a block diagram of an exemplary DC-DC conversion unit.

FIG. 1 is a block diagram of an exemplary DC-DC conversion unit 100. DC-DC conversion unit 100 is configured to receive and convert a DC input voltage received from a DC power source 102 into a DC output voltage. In the exemplary embodiment, DC-DC conversion unit 100 includes a first stage 104 having a boost circuit 106 and a second stage 108 having a DC-DC converter 110. Boost circuit 106 is configured to receive the DC input voltage from DC power source 102. The DC input voltage ranges from a minimum input voltage value to a maximum input voltage value. Boost circuit 106 is configured to boost the DC input voltage to a predefined nominal voltage value when the received DC input voltage has a value between the minimum input voltage value and the predefined nominal voltage value, and outputs a boost voltage Vboost. Boost circuit 106 is configured maintain the received DC input voltage at its current value when the received DC input voltage has a value that is greater than or equal to the predefined nominal voltage value and less than the maximum input voltage value. The boosted or maintained DC voltage is provided to DC-DC converter 110, which converts the boosted DC voltage or the maintained DC voltage to a DC output voltage to a level required by a load 112.

In the exemplary embodiment, boost circuit 106 includes an input capacitor C1 113, a boost inductor L1 114, a boost diode D1 116, and a boost MOSFET Q1 118. Boost circuit 106 further includes a bypass MOSFET Q2 120, a bypass diode D2 122 coupled in parallel to bypass MOSFET Q2 120, and a bulk capacitor C2 124 coupled across a DC link 126. More specifically, in the exemplary embodiment, boost circuit 106 includes a boost circuit input 128 configured to be coupled to DC power source 102 and a boost circuit output 130 coupled to DC link 126. Boost inductor L1 114 is series-coupled to boost diode D1 116 between boost circuit input 128 and boost circuit output 130. Boost MOSFET Q1 is coupled at a first end to a common node defined between boost inductor L1 114 and boost diode D1 116, and at a second end to earth ground. Bypass diode D2 122 includes a first end coupled to boost circuit input 128 and a second end coupled to boost circuit output 130. Bypass diode D2 122 is configured to couple the received DC input voltage directly to DC-DC converter 110 when the DC input voltage is maintained by boost circuit 106. Bypass MOSFET Q2 120 is parallel-coupled to bypass diode D2 122 and is configured to increase efficiency of conversion unit 100.

In the exemplary embodiment, DC-DC converter 110 is a full-bridge circuit that is configured to convert the boost voltage Vboost to a voltage required by load 112 and output it as an output voltage Vout. Alternatively, DC-DC converter 110 may be a forward converter, a push-pull converter, a half-bridge converter, or any other transfer converter that enables DC-DC converter 110 to function as described herein.

DC-DC converter 110 operates at input voltages ranging from a minimum input voltage $Vin_{min}$ to a maximum input voltage $Vin_{max}$. However, DC-DC converter 110 operates at an optimized operating condition at a nominal voltage $Vin_{nom}$. At nominal input voltage $Vin_{nom}$, DC-DC converter 110 works at near a 100% duty cycle which is the most optimized operating condition and at an increased efficiency.

In the exemplary embodiment, the efficiency of DC-DC converter 110 may be further improved using a control method to operate boost circuit 106. When the input voltage Vin ranges from the minimum input voltage $Vin_{min}$ up to the nominal voltage $Vin_{nom}$, boost circuit 106 becomes operational to step-up the input voltage Vin to a boost voltage Vboost equal to the nominal voltage $Vin_{nom}$. More specifically, boost inductor L1 114, boost diode D1 116, and boost MOSFET Q1 118 become operational to step-up the input voltage Vin. During this time, bypass MOSFET Q2 120 and parallel-coupled bypass diode D2 122 are not operational.

For example, where the input voltage Vin ranges from 20 Vdc to 30 Vdc and the nominal voltage $Vin_{nom}$ is 27 Vdc, boost circuit 106 will be operational when the input voltage Vin ranges from 20 Vdc to any voltage less than 27 Vdc. Boost circuit 106 is configured to step up the input voltage Vin to the nominal voltage $Vin_{nom}$ of 27 Vdc and output it as the boost voltage Vboost. The presence of boost circuit 106 adjusts the input voltage to DC-DC converter 110 from 20~30 Vdc to 27~30 Vdc. This enables DC-DC converter 110 to operate at its optimized operating condition of nearly 100% duty cycle at the nominal input voltage $Vin_{nom}$ and increases total efficiency.

Alternatively, when the input voltage Vin ranges from the nominal voltage $Vin_{nom}$ to maximum input voltage $Vin_{max}$, boost circuit 106 maintains the input voltage at its current value. More specifically, bypass MOSFET Q2 120 and parallel-coupled bypass diode D2 122 are operational to bypass boost circuit 106 and couple the boost voltage Vboost directly to the input voltage Vin. Because the input voltage Vin is already at the level of the nominal voltage $Vin_{nom}$, it is not necessary to step-up the voltage provided to DC-DC converter 110. Accordingly, the input voltage Vin is maintained and fed directly to DC-DC converter 110.

Continuing with the example provided above, when the input voltage Vin ranges from 27 Vdc~30 Vdc, bypass MOSFET Q2 120 and parallel-coupled bypass diode D2 122 are operational to couple the boost voltage Vboost directly to the input voltage Vin. When the input voltage Vin ranges from 27 Vdc~30 Vdc, DC-DC converter 110 operates at its optimized operating condition of nearly 100% duty cycle. Moreover, the total efficiency increases by about 1.5% because boost circuit 106 is not operational.

With the input voltage of DC-DC converter 110 ranging from the nominal voltage $Vin_{nom}$ to maximum input voltage $Vin_{max}$, a transformer turn ratio may be re-designed to enable DC-DC converter 110 to operate at near 100% duty cycle with the new minimum voltage $V_{min}$ equal to the nominal voltage $Vin_{nom}$. This enables DC-DC converter 110 to realize an optimized design that has a duty cycle near 100% at the nominal voltage $Vin_{nom}$ of 27 Vdc. When DC-DC converter 110 runs at this condition, a primary peak current and RMS current are reduced, and a switching and conduction losses are also reduced. As a result, an efficiency of DC-DC converter will increase. At the nominal voltage $Vin_{nom}$, boost circuit 106 does not operate, so it has no losses. The loss associated with bypass MOSFET Q2 120 is negligible. Thus, the total efficiency is improved largely when the input voltage Vin is equal to or above the nominal voltage $Vin_{nom}$.

Figure 2:
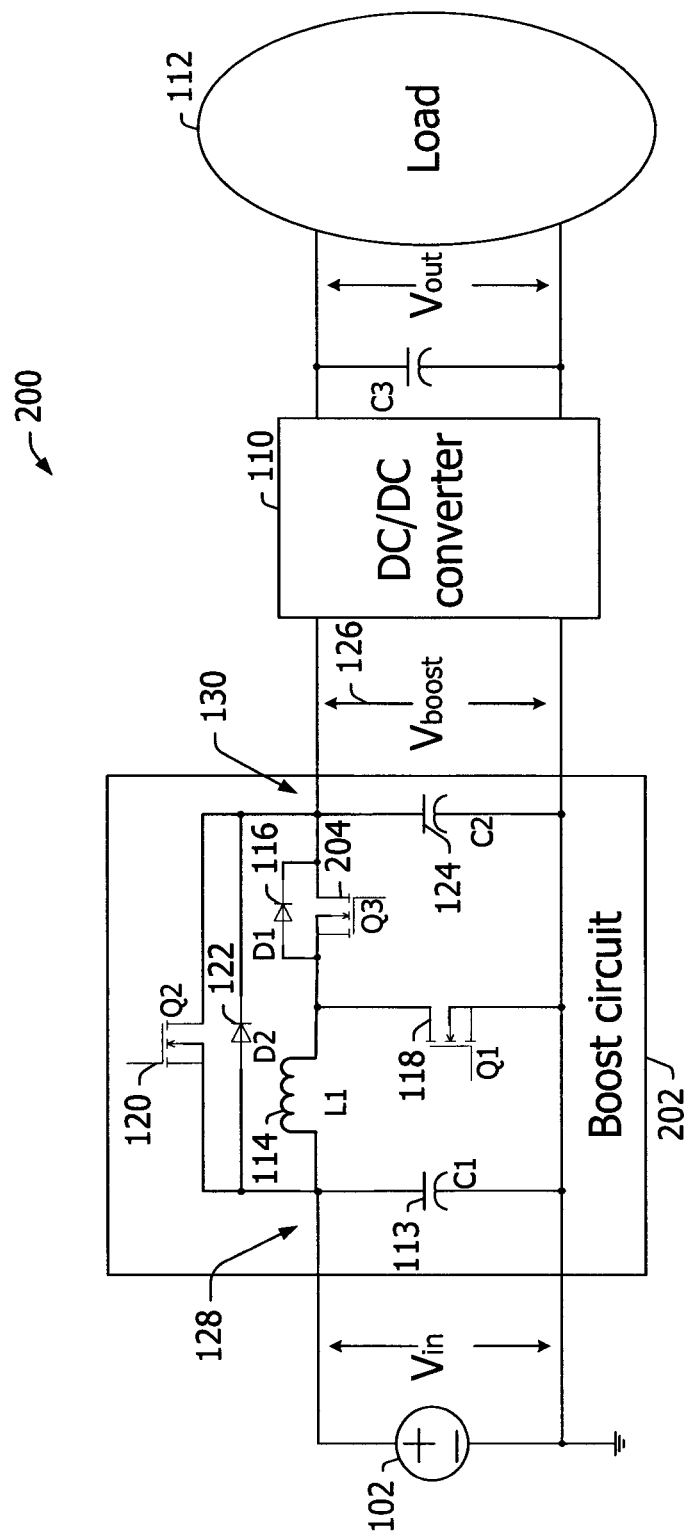
FIG. 2 is a block diagram of the DC-DC conversion unit shown in FIG. 1, including a synchronous boost circuit.

FIG. 2 is a block diagram of DC-DC conversion unit 200 including a synchronous boost circuit 202. In the exemplary embodiment, DC-DC conversion unit 200 is substantially similar to DC-DC conversion unit 100 (shown in FIG. 1). Synchronous boost circuit 202 is used to improve the efficiency of boost circuit 106 (shown in FIG. 1) by coupling a synchronous MOSFET Q3 204 in parallel with boost diode D1 116 (shown in FIG. 1). For voltages ranging from the nominal voltage $Vin_{nom}$ to the maximum input voltage $Vin_{max}$, large input currents travel through the bypass MOSFET Q2 120 (shown in FIG. 1) and/or the bypass diode D2 122 (shown in FIG. 1), so the power loss is significant, especially for low input voltage and high power converter applications. Thermal properties of boost MOSFET Q1 118 (shown in FIG. 1), bypass MOSFET Q2 120, bypass diode D2 122, and MOSFET Q3 204 may also be considered in this implementation.

Figure 3:
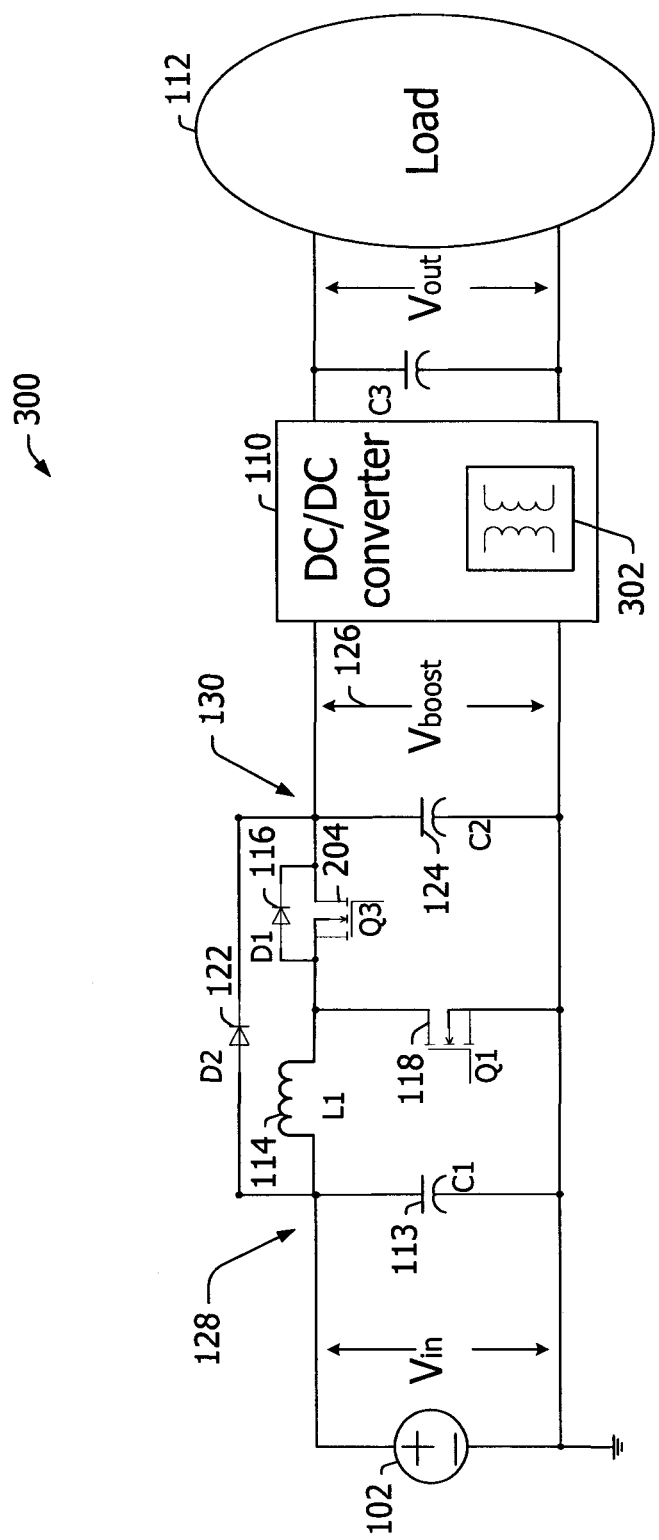
FIG. 3 is a block diagram of an alternative embodiment of the DC-DC conversion unit shown in FIG. 2.

FIG. 3 is a block diagram of an alternative DC-DC conversion unit 300. In the exemplary embodiment, DC-DC conversion unit 300 is substantially similar to DC-DC conversion unit 100 (shown in FIG. 1) and DC-DC conversion unit 200 (shown in FIG. 2). In the exemplary embodiment, to simplify the circuitry and control and reduce costs associated with DC-DC conversion unit 300, bypass MOSFET Q2 120 is removed from DC-DC conversion unit 300. As a result, bypass diode D2 122 is only used for protecting DC-DC conversion unit 300 from surge currents and the thermal issues described above become negated. When the input voltage Vin ranges from the nominal voltage $Vin_{nom}$ to maximum input voltage $Vin_{max}$ (i.e., 27 Vdc~30 Vdc) and boost circuit 106 maintains the input voltage, input current will travel through boost inductor L1 114 and MOSFET Q3 204, rather than through bypass MOSFET Q2 120. This increases loss on boost inductor L1 114 and slightly decreases the total efficiency.

To realize an increased efficiency at nominal voltage $Vin_{nom}$ (i.e., 27 Vdc), boost circuit 106 should not be operational when input voltage Vin is equal or greater than the nominal voltage $Vin_{nom}$. When the input voltage Vin is below the nominal voltage $Vin_{nom}$, boost circuit 106 operates to set the boost voltage Vboost at 27 Vdc. Thus, the input voltage of DC-DC converter 110 is Vboost, which changes from 20~30 Vdc to 27~30 Vdc. This enables DC-DC converter 110 to realize an optimized design having a duty cycle near 100% at nominal input voltage $Vin_{nom}$ of 27 Vdc.

In the exemplary embodiment, DC-DC converter 110 includes a transformer 302 configured to transfer the power, convert the voltage to a different voltage, and isolate a converter primary side from a converter secondary side. Transformer 302 is selected based on the topology of DC-DC converter 110 (i.e., half-bridge, full-bridge, etc.) and the output power level. A suitable turns ratio for transformer 302 is determined based on the input voltage range and the output voltage range.

In the exemplary embodiment, the transformer turns ratio may be re-designed to realize a duty cycle near 100%. However, it may be difficult to re-design the transformer turns ratio to realize a duty cycle near 100%, especially for relatively large power converters, because the winding turns of the transformer are typically relatively small. For example, where the maximum output voltage $Vout_{max}$ is 55 Vdc, DC-DC conversion unit 300 was originally designed for a minimum input voltage $Vin_{min}$ of 20 Vdc. That is, the original design provided for a transformer primary having two turns and a transformer secondary having 6 turns. The duty cycle for the original design is calculated to be about 93% at 20 Vdc and 69% at 27 Vdc. However, because the input voltage Vin has been limited to 27 Vdc~30 Vdc, the transformer turns may be re-designed around this input voltage range.

A first method of re-designing the transformer turns includes changing the number of secondary turns from six turns to five turns. The duty cycle for the first method is about 83% at 27 Vdc with an increase in efficiency of about 0.7%.

A second method of re-designing the transformer turns includes changing the secondary turns from six turns to four turns. The duty cycle for the second method is about 104% at 27 Vdc. which is incorrect because the maximum duty cycle cannot exceed 100%. The most suitable number of secondary turns would be 4.2 turns. This would enable a realization of a duty cycle near 100% at 27 Vdc, but the winding turns of the transformer should be an integer best and the decimal of 4.2 turns are very hard to realize.

The second method may also be used to improve the control strategy of boost circuit 106. By slightly increasing the boost voltage Vboost from 27~30 Vdc to 28~30 Vdc, the duty cycle is 100% at 28 Vdc and DC-DC converter 110 efficiency is increased by about 1.5%. Because boost circuit 106 boosts the voltage from 27 Vdc to 28 Vdc at the nominal voltage $Vin_{nom}$ 27 Vdc, the total efficiency slightly decreases when the input voltage is from 27 Vdc to 28 Vdc. Calculations show that boost circuit 106 efficiency is above 99.2% when it boosts the voltage from 27 Vdc to 28 Vdc, which is an acceptable total efficiency for the converter.

The second method may further be used to simplify the control circuit and strategy of boost circuit 106. Before simplification, the second method boost circuit control strategy includes boosting the input voltage by boost circuit 106 when the input voltage Vin is below 28 Vdc and setting the boost voltage at 28 Vdc. When the input voltage Vin is equal to or greater than 28 Vdc, boost circuit 106 maintains the input voltage. The boost voltage Vboost is directly connected to the input voltage Vin by boost inductor L1 114 and MOSFET Q3 204. At this condition, MOSFET Q3 204 always remains in an "ON" position.

Because MOSFET Q3 204 is always ON and boost MOSFET Q1 118 is always "OFF" when boost circuit maintains the input voltage, a conventional half-bridge driver integrated circuit (IC) cannot be used because the bootstrap circuit is disabled when boost MOSFET Q1 118 is always OFF. A driver transformer cannot be used because MOSFET Q3 204 is always ON when boost circuit 106 is non-operational. Even if a high-speed digital isolator IC were used to realize the driver of MOSFET Q3 204, a second driver IC would still be necessary to drive MOSFET Q3 204 because the isolator IC does not have sufficient driver current and would still need another isolated bias. Moreover, high-speed digital isolator IC's are complicated and costly.

When using the second method, operating boost circuit 106 at the nominal voltage $Vin_{nom}$ 27 Vdc decreases the total efficiency by about 0.6%. Efficiency at the nominal voltage $Vin_{nom}$ is less relevant at high input voltages Vin. The driver circuit and the control strategy of MOSFET Q3 204 may then be simplified by always operating boost circuit 106. The control method includes enabling boost circuit 106 to be operational when the input voltage Vin is less than 28 Vdc. The boost voltage Vboost is set at 28 Vdc. When the input voltage Vin is equal to or greater than 28 Vdc, boost circuit 106 remains operational and the boost voltage Vboost is set at Vin+1V. Alternatively, the boost voltage Vboost may be set at Vin+0.5V or Vin+2V, but boost circuit 106 efficiency is higher when the boost voltage Vboost is lower.

An exemplary technical effect of the methods and systems described herein includes at least one of: (a) receiving, by a boost circuit, a direct current (DC) input voltage from a power supply, the DC input voltage ranging from a minimum input voltage value to a maximum input voltage value; (b) boosting, by the boost circuit, the DC input voltage to a predefined nominal voltage value when the DC input voltage has a value between the minimum input voltage value and the predefined nominal voltage value; (c) maintaining, by the boost circuit, the DC input voltage when the DC input voltage has a value that is greater than or equal to the predefined nominal voltage value and less than the maximum input voltage value; and (d) converting, by a DC-DC converter coupled to an output of the boost circuit, the one of the boosted DC voltage and the maintained DC voltage to a DC output voltage.

Exemplary embodiments of systems and methods of improving DC-DC converter efficiency are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power conversion unit comprising:
a boost circuit comprising:
an input configured to receive a direct current (DC) input voltage from a power supply, the DC input voltage ranging from a minimum input voltage value to a maximum input voltage value;
boost circuitry coupled to the input and configured to boost the DC input voltage to a predefined nominal voltage value when the DC input voltage has a value between the minimum input voltage value and the predefined nominal voltage value, the predefined nominal voltage value being between the minimum and maximum input voltage values; and
a bypass switch coupled in parallel to said boost circuitry, the bypass switch configured to bypass the boost circuitry based on the DC input voltage, wherein the bypass switch is closed such that the boost circuit outputs a maintained DC voltage when the DC input voltage has a value that is greater than or equal to the predefined nominal voltage value and less than the maximum input voltage value, the maintained DC voltage being equal to the DC input voltage; and
a DC-DC converter coupled to and configured to receive an output of said boost circuit that is greater than or equal to the predefined nominal voltage value regardless of the DC input voltage value between the minimum and maximum input voltage values, the DC-DC converter configured to convert the one of the boosted DC voltage and the maintained DC voltage to a DC output voltage, wherein the DC-DC converter operates at substantially 100% duty cycle and at its highest efficiency at or above the predefined nominal voltage value.

2. The power conversion unit of claim 1, wherein said boost circuit comprises:
a boost circuit input configured to be coupled to the power supply; and
a boost circuit output coupled to a DC link.

3. The power conversion unit of claim 2, further comprising:
a boost inductor series-coupled to a boost diode between said boost circuit input and said boost circuit output; and
a boost MOSFET coupled at a first end to a common node defined between said boost inductor and said boost diode, and at a second end to earth ground.

4. The power conversion unit of claim 3, further comprising:
a bypass diode having a first end coupled to said boost circuit input and a second end coupled to said boost circuit output, said bypass diode configured to provide the DC input voltage directly to said DC-DC converter when said boost circuit maintains the DC input voltage; and
wherein the bypass switch is a bypass MOSFET parallel-coupled to said bypass diode, said bypass MOSFET configured to increase efficiency of said power conversion unit.

5. The power conversion unit of claim 4, wherein said boost circuit further comprises a synchronous MOSFET parallel-coupled to said boost diode, said synchronous MOSFET configured to increase efficiency of said power conversion unit.

6. The power conversion unit of claim 3, wherein said boost circuit further comprises:
a bypass diode having a first end coupled to said boost circuit input and a second end coupled to said boost circuit output, said bypass diode configured to protect said boost circuit from surge current when said boost circuit maintains the DC input voltage; and
wherein the bypass switch is a synchronous MOSFET parallel-coupled to said boost diode, said synchronous MOSFET configured to increase efficiency of said power conversion unit.

7. The power conversion unit of claim 1, wherein said boost circuit is further configured to boost the DC input voltage to up to two volts higher than the DC input voltage when the DC input voltage has a value that is greater than or equal to the predefined nominal voltage value and less than the maximum input voltage value.

8. The power conversion unit of claim 1, wherein said DC-DC converter operates at a 100% duty cycle.

9. A method of improving efficiency in a power conversion unit, said method comprising:
receiving, by a boost circuit, a direct current (DC) input voltage from a power supply, the DC input voltage ranging from a minimum input voltage value to a maximum input voltage value;
boosting, using boost circuitry of the boost circuit, the DC input voltage to a predefined nominal voltage value when the DC input voltage has a value between the minimum input voltage value and the predefined nominal voltage value, the predefined nominal voltage value being between the minimum and maximum input voltage values;
closing, by the boost circuit, a bypass switch to bypass the boost circuitry based on the DC input voltage, wherein the bypass switch is closed such that the boost circuit outputs a maintained DC voltage when the DC input voltage has a value that is greater than or equal to the predefined nominal voltage value and less than the maximum input voltage value, the maintained DC voltage being equal to the DC input voltage;
receiving, by a DC-DC converter coupled to the boost circuit, an output of the boost circuit that is greater than or equal to the predefined nominal voltage value regardless of the DC input voltage value between the minimum and maximum input voltage values, wherein the DC-DC converter operates at substantially 100% duty cycle and at its highest efficiency at or above the predefined nominal voltage value; and
converting, by the DC-DC converter, the one of the boosted DC voltage and the maintained DC voltage to a DC output voltage.

10. The method of claim 9, further comprising providing, by a bypass diode having a first end coupled to a boost circuit input and a second end coupled to a boost circuit output, the DC input voltage directly to the DC-DC converter when the boost circuit is maintaining the DC input voltage.

11. The method of claim 10, further comprising increasing efficiency of the power conversion unit using a bypass MOSFET parallel-coupled to the bypass diode.

12. The method of claim 11, further comprising increasing efficiency of the power conversion unit using a synchronous MOSFET parallel-coupled to a boost diode of the power conversion unit.

13. The method of claim 9, further comprising protecting the boost circuit from surge current when the boost circuit is maintaining the DC input voltage using a bypass diode having a first end coupled to a boost circuit input and a second end coupled to a boost circuit output.

14. The method of claim 9, further comprising boosting the DC input voltage to up to two volts higher than the DC input voltage when the received DC input voltage has a value that is greater than or equal to the predefined nominal voltage value and less than the maximum input voltage value.

15. The method of claim 9, further comprising operating the DC-DC converter at a 100% duty cycle.

16. A boost circuit comprising:
an input configured to receive a direct current (DC) input voltage from a power supply, the DC input voltage ranging from a minimum input voltage value to a maximum input voltage value;
boost circuitry coupled to the input and configured to boost the DC input voltage to a predefined nominal voltage value when the DC input voltage has a value between the minimum input voltage value and the predefined nominal voltage value, the predefined nominal voltage value being between the minimum and maximum input voltage values, wherein the boosted DC input voltage operates a DC-DC converter coupled to an output of said boost circuitry at substantially 100% duty cycle; and
a bypass switch coupled in parallel to said boost circuitry, the bypass switch configured to bypass the boost circuitry based on the DC input voltage, wherein the bypass switch is closed such that the boost circuit outputs a maintained DC voltage when the DC input voltage has a value that is greater than or equal to the predefined nominal voltage value and less than the maximum input voltage value, wherein the maintained DC input voltage operates a DC-DC converter coupled to an output of said bypass switch at substantially 100% duty cycle.

17. The boost circuit of claim 16, comprising:
a boost circuit input configured to be coupled to the power supply; and
a boost circuit output coupled to a DC link.

18. The boost circuit of claim 17, further comprising:
a boost inductor series-coupled to a boost diode between said boost circuit input and said boost circuit output; and
a boost MOSFET coupled at a first end to a common node defined between said boost inductor and said boost diode, and at a second end to earth ground.

19. The boost circuit of claim 18, further comprising:
a bypass diode having a first end coupled to said boost circuit input and a second end coupled to said boost circuit output, said bypass diode configured to provide the DC input voltage directly to said DC-DC converter when said boost maintains the DC input voltage;
wherein the bypass switch is a bypass MOSFET parallel-coupled to said bypass diode, said bypass MOSFET configured to increase efficiency of said power conversion unit; and
a synchronous MOSFET parallel-coupled to said boost diode, said synchronous MOSFET configured to increase efficiency of said power conversion unit.

20. The boost circuit of claim 18, further comprising:
a bypass diode having a first end coupled to said boost circuit input and a second end coupled to said boost circuit output, said bypass diode configured to protect said boost circuit from surge current when said boost circuit maintains the DC input voltage; and
a synchronous MOSFET parallel-coupled to said boost diode, said synchronous MOSFET configured to increase efficiency of said power conversion unit.

* * * * *